United States Patent [19]
Müller et al.

[11] Patent Number: 6,116,400
[45] Date of Patent: Sep. 12, 2000

[54] ASSEMBLY FOR A FRICTION CLUTCH

[75] Inventors: Roland Müller, Geldersheim; Marco Greubel, Niederwerrn; Erwin Ziegler, Wasserlosen-Gressthal; Winfried Stürmer, Euerbach; Frank Hirschmann, Niederwerrn, all of Germany

[73] Assignee: Mannesmann Sachs AG, Schweinfurt, Germany

[21] Appl. No.: 09/325,961

[22] Filed: Jun. 4, 1999

[30] Foreign Application Priority Data

Jun. 5, 1998 [DE] Germany .......................... 198 25 135
May 19, 1999 [DE] Germany .......................... 199 22 875

[51] Int. Cl.[7] .............................. F16D 13/71; F16D 13/58
[52] U.S. Cl. ..................................... 192/109 R; 192/70.18
[58] Field of Search ............................ 192/109 R, 70.22, 192/70.18, 114 R

[56] References Cited

U.S. PATENT DOCUMENTS

| | | | |
|---|---|---|---|
| 4,562,636 | 1/1986 | Carmillet | 192/89.23 X |
| 4,577,740 | 3/1986 | Carmillet | 192/70.18 |
| 4,609,086 | 9/1986 | Vogel | 192/109 R X |
| 4,697,685 | 10/1987 | Bancroft | 192/109 R |

FOREIGN PATENT DOCUMENTS

| | | | |
|---|---|---|---|
| 0 207 597 | 1/1987 | European Pat. Off. | F16D 13/71 |
| 0 849 483 A1 | 6/1998 | European Pat. Off. | F16D 13/71 |
| 1285326 | 8/1972 | United Kingdom | F16D 13/50 |
| 2 022 730 | 12/1979 | United Kingdom | F16D 13/71 |
| 2 312 256 | 10/1997 | United Kingdom | F16D 13/75 |

*Primary Examiner*—Rodney H. Bonck
*Attorney, Agent, or Firm*—Cohen, Pontani, Lieberman & Pavane

[57] ABSTRACT

An assembly for a motor-vehicle friction clutch, in which a pressure plate and a pressure spring are preassembled in a clutch casing. The pressure plate can move in the axial direction with respect to the clutch casing and is connected to the clutch casing in a rotationally fixed manner by means of leaf springs. A releasable transport securing device prevents the pressure plate from moving in the axial direction toward the open side of the clutch casing. The securing device acts between a stop area, which limits the axial displacement of the pressure plate or is formed by said pressure plate, and a corresponding opposing stop area on the clutch casing. The transport securing device is a locking element which is held between the stop area and the opposing stop area by frictional force or a form fit, and can be disengaged by spring force when the clutch is fitted or when the clutch is first actuated.

20 Claims, 9 Drawing Sheets

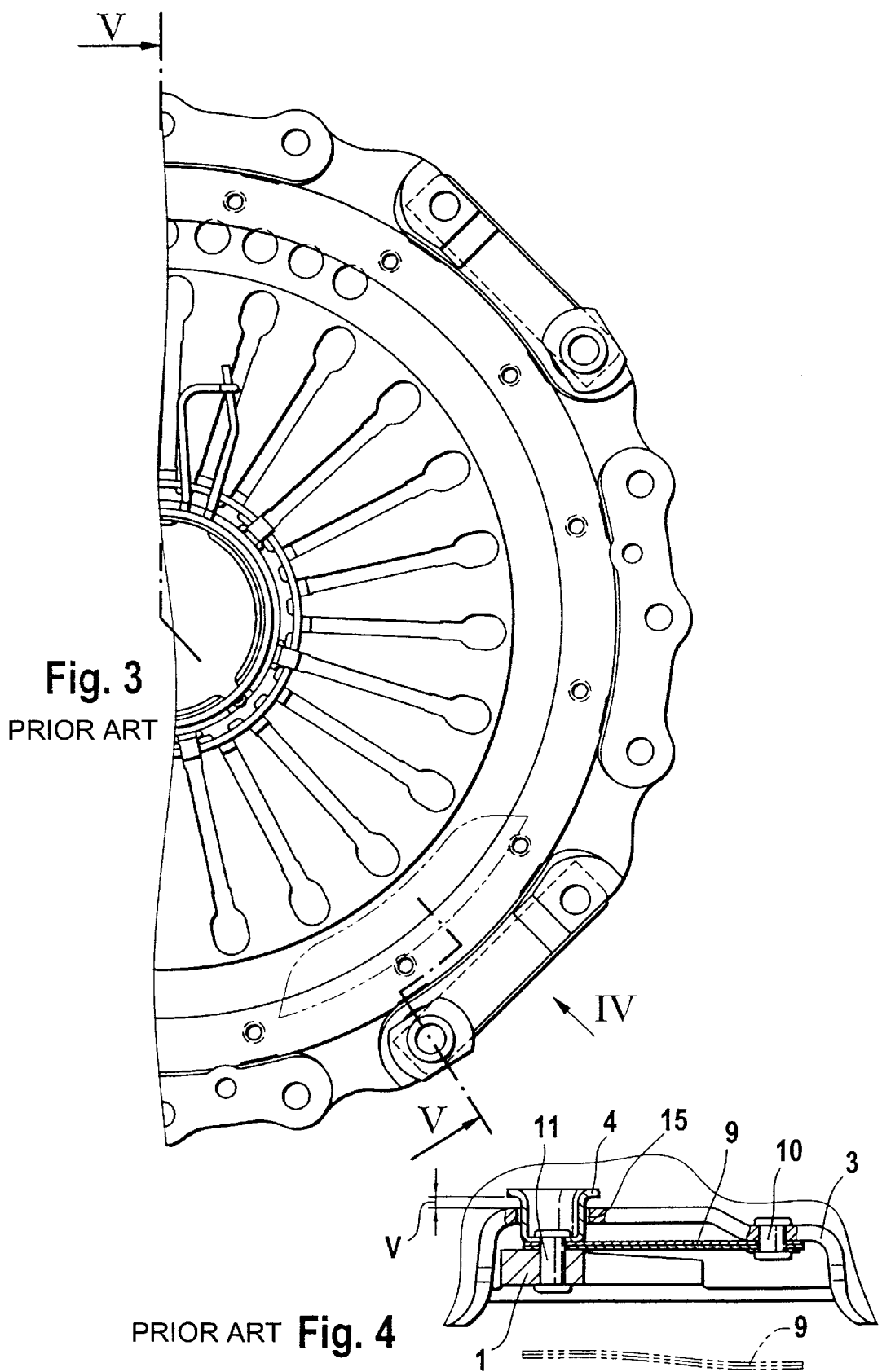

ASSEMBLY FOR A FRICTION CLUTCH

BACKGROUND OF THE INVENTION

1. Field of the Invention

The invention relates to a motor-vehicle friction clutch, and more particularly to an assembly for a friction clutch having a fitting aid and transport securing means.

2. Description of the Related Art

Such a preassembled assembly has long been marketed by the applicant and is explained in more detail in the description of the figures with reference to FIGS. 3 to 5.

The preassembled assembly is supplied, for example, to the assembly line, where it is connected, for example, to the flywheel of an internal-combustion engine after the friction disc has been interposed. The weight of the pressure plate, which is only connected to the clutch casing via the tangential leaf springs, is rather high. The tangential leaf springs serve not only to connect the pressure plate to the clutch casing in a rotationally fixed manner, but also, in the installed state, to lift the pressure plate off the friction linings when disengaging the clutch, which is when the load from the diaphragm spring is relieved. The tangential leaf springs are not capable of holding the pressure plate in position during transport if they are subjected to strong vibrations in the axial direction. If the assembly is stored in the upright position before it is fitted (for example when the clutch is changed) and accidentally falls over, there is a risk of the pressure plate springing out toward the open end of the clutch casing. In the event of such axial movements, there is a risk of the tangential leaf springs being excessively extended and of no longer functioning fully when the clutch is operated. For this reason, a transport securing means is provided which prevents the pressure plate from being unintentionally deflected.

Moreover, the transport securing means serves as a fitting aid when the assembly is screwed to the flywheel. Since the diaphragm spring exerts a load on the pressure plate toward the flywheel and deflects the plate through its full axial travel, the pressure plate has to be pressed back toward the diaphragm spring when the connection screws are being tightened. Owing to the high force of the diaphragm spring, the connection screws can only be turned a few degrees into the flywheel to avoid distortion of the component during fitting or an excessive load on the screw threads.

Since the transport securing means limits the axial travel of the pressure plate, during the initiation of fitting the pressure plate does not bear against the flywheel, and since at this time there is no need to overcome any force from the diaphragm spring, it is easier to screw the assembly to the flywheel. In the known assembly, a U-shaped clip is inserted on the outside between the clutch casing and the catch part. The U-shaped clip limits the maximum possible axial travel distance (lining wear) of the pressure plate, as the transport securing means and fitting aid. This clip is clamped in place by the force of the diaphragm spring. The thickness of the clip is slightly less than the maximum permissible axial travel distance of the pressure plate. If the clutch casing is screwed to the flywheel, the pressure plate has to be pressed into the clutch casing counter to the force of the diaphragm spring toward the end of the screwing length. The catch part lifts off from the clip, and the clip falls downward or is removed outward in the radial direction by hand.

A drawback of this transport securing means is that since slight friction forces still prevail between the catch part and the clutch casing, tolerances in the thickness of the clip may lead to it not automatically falling out after the assembly has been connected to the flywheel. Deformation of the clip may also lead to it continuing to "stick" to the clutch casing after fitting, even though the catch part has been lifted off. If the assembly staff does not notice this, the clip will be flung outward by the centrifugal forces when the clutch is first used and may damage or even destroy surrounding components, such as for example the transmission unit or the like. There is also a risk of the clip not falling out completely, but rather becoming suspended somewhere in the area of the clutch. Everything will appear to be in order to the fitter who visually checks that the transport securing means has been detached. In this case too, centrifugal forces may fling the clip outward when the clutch is first used, resulting in damage.

EP 0 207 597 A1 has disclosed transport securing means and fitting aids which are provided inside the clutch casing. For this purpose, a wire spring is riveted to the casing and its free end engages in a circumferential groove which is provided in the pressure plate. In the stress-free state, the spring bears radially against the clutch casing. In order to allow the transport securing means to become active, the spring has to be pressed radially inward by means of a tool, via a hole which is provided in the casing, until it snaps into the pressure plate. At the end of the operation of connecting the preassembled friction clutch to the flywheel, the pressure plate is displaced toward the diaphragm spring in the axial direction and the spring disengages from the pressure plate and snaps back onto the inside of the clutch casing. A drawback of this design is that the pressure plate has to be additionally machined in the radial circumferential groove in order to have a defined contact surface for the spring. This additional machining is time-consuming and expensive. Moreover, it is impossible or very difficult to check the state of the spring, thus possibly preventing damage from being recognized in sufficient time. If the spring breaks, there is again a risk, as described above, of the tangential leaf springs being excessively extended, or of damage to the pressure surface of the pressure plate when the latter strikes hard against the base or the like.

The same document has disclosed further transport securing means. By way of example, a spring clip may be provided on the rivet which attaches the tangential leaf spring to the pressure plate and which, in the stress-free state, jumps back in the radially inward direction and projects axially through the clutch casing. In order to secure the pressure plate, the spring clip is pressed radially outward, and its hook-like end then positions itself against the clutch casing. This limits the axial movement of the pressure plate in the direction of the open side of the clutch casing. If the pressure plate is subjected to load in the other axial direction during fitting, the bent end of the spring clip disengages from the clutch casing and springs away in the radially inward direction, so that the transport securing means becomes free. A drawback of this design is that the spring clip may bend up in the event of excessive axial forces during transport, so that the transport securing means becomes ineffective.

SUMMARY OF THE INVENTION

In view of these problems, an object of the invention is to improve the transport securing means of the prior art.

To solve this problem, an assembly of the generic type is distinguished by the fact that a locking element is held between the stop area and an opposing stop area by frictional force or a form fit. The locking element can be disengaged by spring force when the clutch is fitted or when the clutch is first actuated.

This design ensures that only compressive forces act on the transport securing means in operation. Therefore there is no possibility of damage. If, during fitting of the assembly to the flywheel, the opposing stop area is lifted off the locking element, the load on the spring clip is relieved, and the clip pulls the locking element out of the active area.

The transport securing means is preferably formed by at least one spring clip which is attached to the outside of the clutch casing and at its free end has a thickened portion which, by the application of a force directed at the spring clip, can be placed between the catch part and the clutch casing.

In a further preferred embodiment, the transport securing means is formed by at least one spring clip which is attached to the pressure plate and at its free end has a thickened portion which, by the application of a force directed at the spring clip, can be placed between the pressure plate and the clutch casing.

If the spring clip is unreleasably connected to the clutch casing or the pressure plate, it is ensured that after the transport securing means has been released the clip cannot be flung off as a result of the centrifugal forces acting thereon. In effect, therefore, there is no possibility of surrounding components being damaged.

The thickened portion of the spring clip may be produced by flanging over the free end. However, it may also be formed by a small plate or block which is connected to the free end of the spring clip. This plate or block may, for example, be welded to the spring clip.

In order to form the thickened section, the spring clip may also be of U-shaped design at its free end, the two legs then being wound inward. The legs are preferably bent upward through 90°.

The thickness of the thickened portion preferably and approximately corresponds to the maximum wear of the friction clutch. As a result, axial movements of the pressure plate are virtually impossible during transport, but it is nevertheless ensured that the transport securing means can release itself automatically.

It is particularly advantageous if a plurality of spring clips are distributed regularly over the circumference of the clutch casing or of the pressure plate, which clips may preferably serve as transport securing means on each catch part.

If the clamped-in end of the spring clip which is attached to the pressure plate is bent up toward the clutch casing, an unrolling radius is formed at the rear end. This unrolling radius can be brought to bear perpendicularly against the deflected tangential leaf spring. This prevents the tangential leaf spring from bending or warping.

In order to simplify the fitting of the spring clip or clips, an antirotation lock with which the spring clip can engage around the tangential leaf spring, is preferably provided on the clamped-in end.

The spring clip preferably has a tab at its free end and the pressure plate has a projection, behind which the tab engages. This ensures that the spring clip is secured in the radial direction even when the transport securing means is released. This prevents the spring clip from bending upward as a result of the centrifugal forces when the pressure plate rotates.

The tab is preferably provided in particular on the thickened portion and projects back toward the clamped-in end of the spring clip.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Exemplary embodiments of the invention are to be explained in more detail below with the aid of a drawing, in which:

FIG. 3 is a partial plan view of a clutch casing;

FIG. 4 is a partial plan view of a part of the clutch casing in the direction of viewing arrow IV in accordance with FIG. 3 of a known assembly;

DETAILED DESCRIPTION OF THE PRESENTLY PREFERRED EMBODIMENTS

Figure 5:
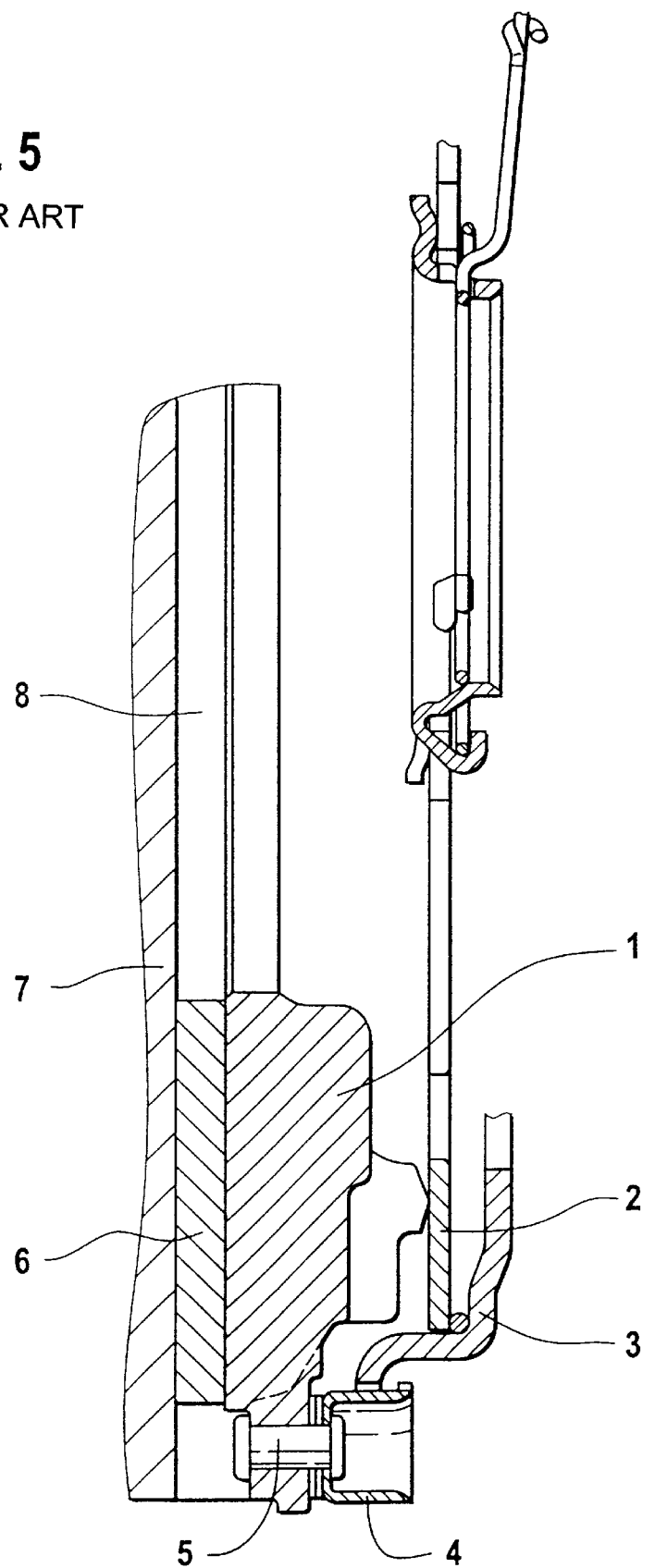
FIG. 5 is a sectional view of the known friction clutch assembly taken along line V—V of FIG. 3.
Figure 6:
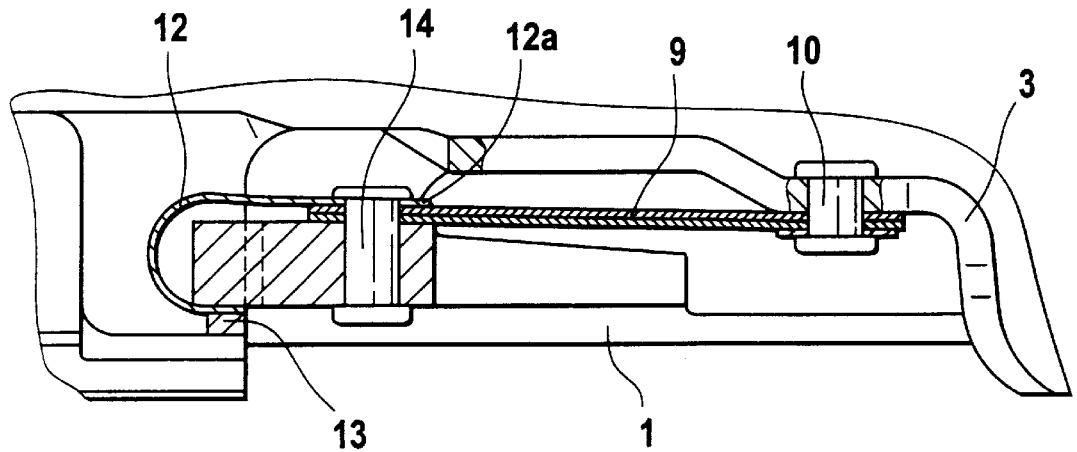
FIG. 6 is a partial plan view of a further embodiment of a component according to the invention with the transport securing means in position.
Figure 7:
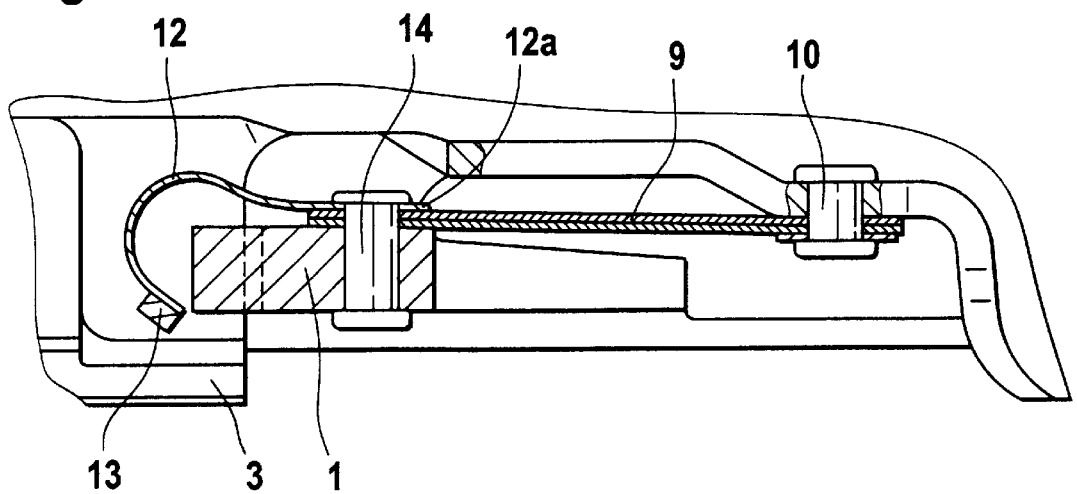
FIG. 7 is a partial plan view in accordance with FIG. 6 with the transport securing means released.

FIGS. 3 to 5 show a conventional friction clutch. The preassembled assembly comprises the clutch casing 3, the pressure plate 1 and the diaphragm spring 2, arranged between pressure plate 1 and clutch casing 3. In operation, diaphragm spring 2 presses the pressure plate 1 toward the friction linings 6 of the clutch disc 8 and the flywheel 7 of an internal-combustion engine, which is not shown in more detail here (FIG. 5). The axial displacement V which is also the maximum wear of the friction linings 6 (FIG. 4) of the pressure plate is limited by a catch sleeve 4, which is connected to the pressure plate 1 by means of a rivet 5 and is guided axially out of an opening 15 provided in the casing 3. The outer end of the catch sleeve 4 is flanged over in the radial direction, thus forming a rim which has a larger diameter than that of the opening 15, so that the flange serves as a stop on the clutch casing 3. The extent of the axial displacement V is dependent on the permitted wear on the friction linings 6. The pressure plate 1 is connected to the clutch casing 3 in a rotationally fixed manner by means of tangential leaf springs 9, which are connected at one end to the clutch casing 3 via rivet 10 and are connected at the other end to the pressure plate 1 and the catch sleeve 4 via rivet 11. In order to prevent axial movement of the pressure plate 1 during transport of the preassembled assembly, a small block or a U-shaped clip is fitted between the flange on the catch sleeve 4 and the outside of the clutch casing 3. The block or clip has a depth slightly less than the maximum permitted extent of wear (axial displacement) V. This small block (clip) blocks the route of the pressure plate 1 toward the open side of the clutch casing 3. If, during fitting, the clutch casing 3 is connected to the flywheel 7 by means of screws (not shown), the pressure plate 1 is pressed into its initial position counter to the force of the diaphragm spring 2 toward the closed side of the clutch casing 3, and the maximum travel or axial displacement V is set as the free space between the flange on the catch sleeve 4 and the clutch casing 3. The slightly less deep block then falls out between the catch sleeve 4 and the clutch casing 3.

Figure 1:
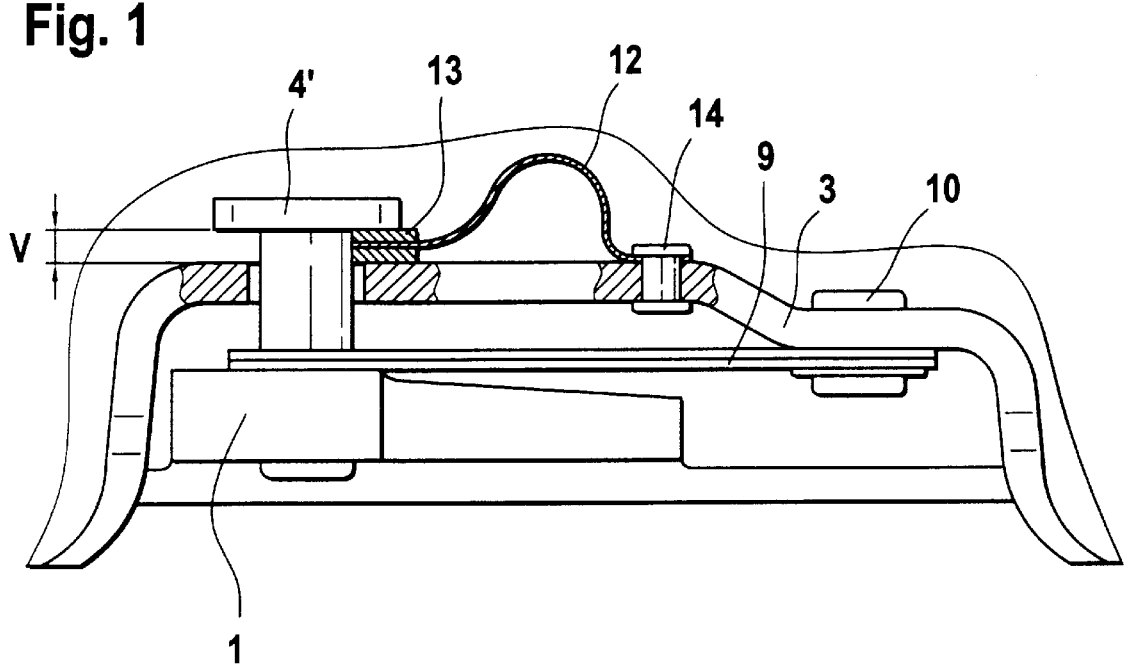
FIG. 1 is a partial plan view of a part of a clutch casing with the transport securing means in position according to an embodiment of the invention.
Figure 2:
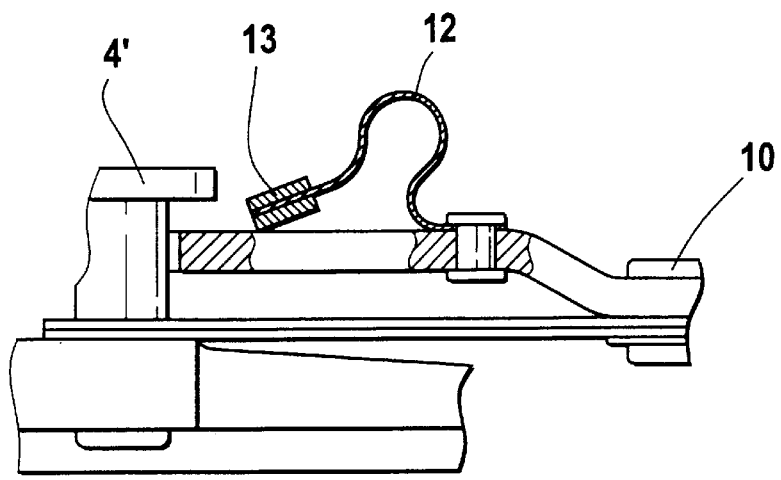
FIG. 2 shows the illustration in accordance with FIG. 1, with the transport securing means released.

The transport securing means according to an embodiment of the invention can be seen in FIGS. 1 and 2. A spring clip 12 is unreleasably connected to the clutch casing 3 by means of a rivet 14. At its free end, the spring clip 12 is provided with a thickened portion 13 which can be produced by bending over the free end or by means of a small block or plate which is welded to the spring clip 12. The thickened portion 13 approximately corresponds to the maximum permitted extent of wear as depicted by the axial displacement V, but is sufficiently smaller to ensure that the thickened portion 13 can reliably snap out between the catch part, which is designed as a catch bolt 4', and the clutch casing 3 when the load on the spring clip 12 is relieved.

In order to produce the transport securing means, the spring clip 12 is loaded with a force which may, for example, be applied manually, and is positioned with the thickened portion between the collars of the catch bolt 4', which reach radially outward, and the clutch casing 3. The collars of catch bolt 4' forms a stop area 4" which limits the axial displacement V of pressure plate 1, and an opposing corresponding stop area 3" is provided on clutch casing 3. The thickened portion 13 is held between stop area 4" an opposing stop area 3" when secured in place. The diaphragm spring (not shown in FIGS. 1 and 2), then presses the pressure plate 1 toward the open end of the clutch casing 3, so that the thickened portion 13 is clamped in between the catch bolt 4' and the clutch casing 3. If the maximum extent of wear V (i.e. axial displacement) is set when the casing 3 is screwed to the flywheel 7, i.e. the pressure plate 1 is moved into its "zero position", the thickened portion 13 snaps out and the transport securing means and fitting aid is released (FIG. 2).

Figure 8:
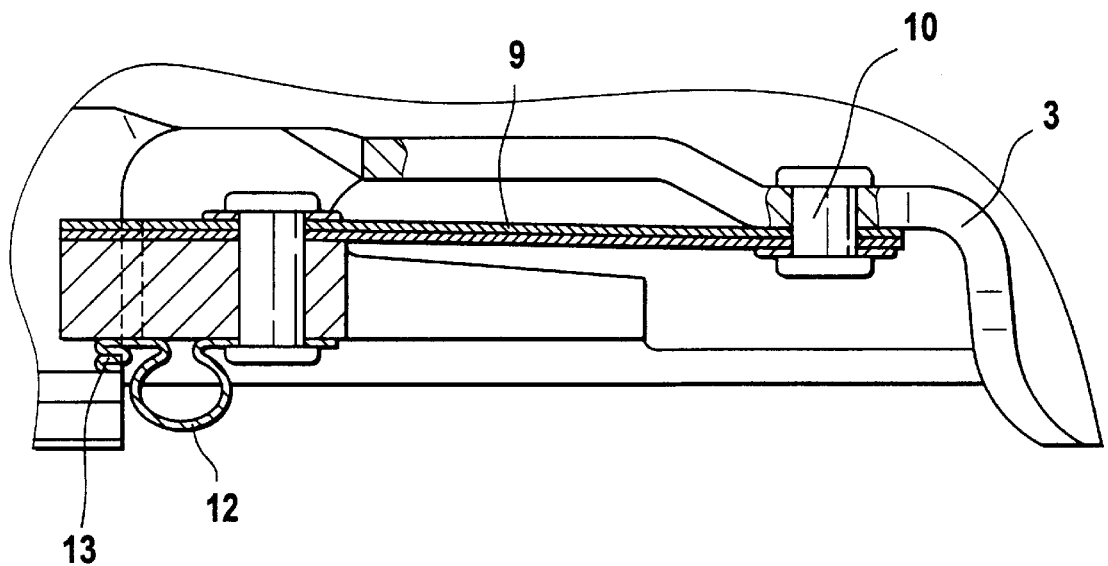
FIG. 8 is a partial plan view of a component according to a third embodiment the invention with the transport securing means in position.
Figure 9:
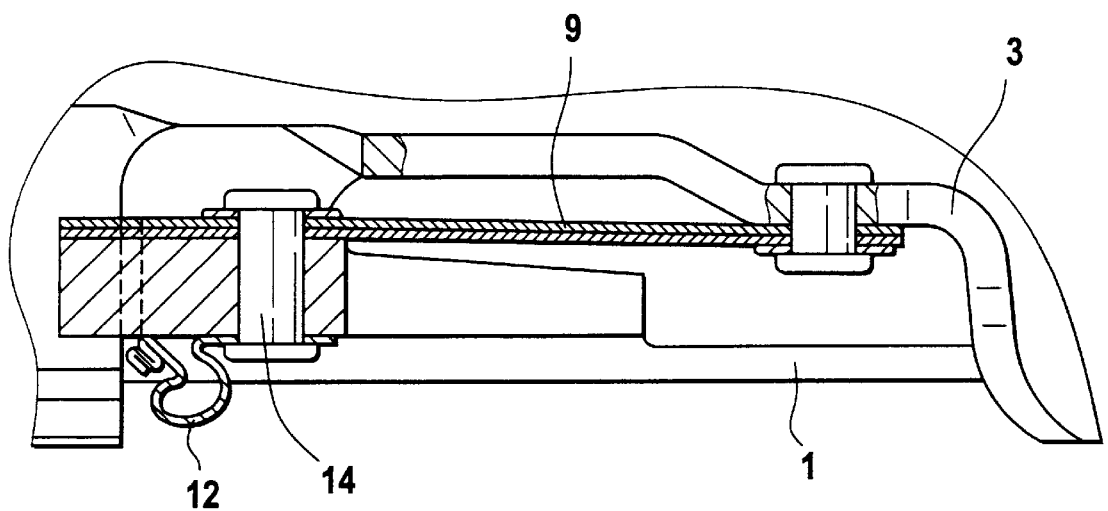
FIG. 9 is a partial plan view in accordance with FIG. 8 with the transport securing means released.
Figure 10:
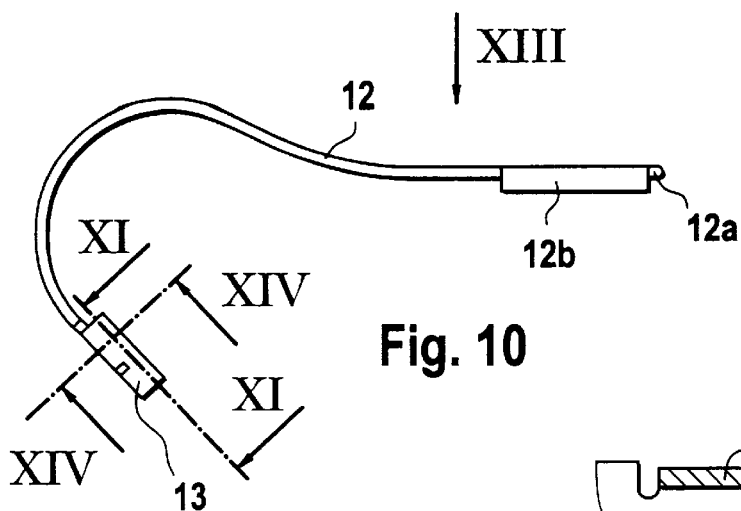
FIG. 10 is a side view of the spring clip according to the invention.
Figure 11:
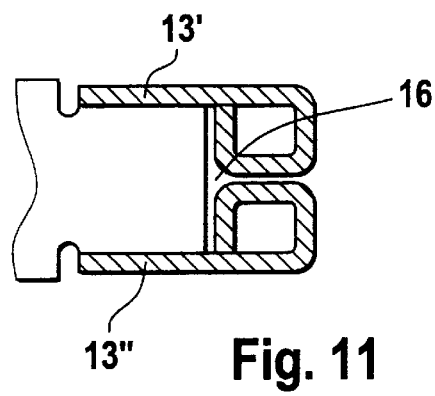
FIG. 11 is a cross-sectional view of the spring clip on line XI—XI of FIG. 10.
Figure 12:
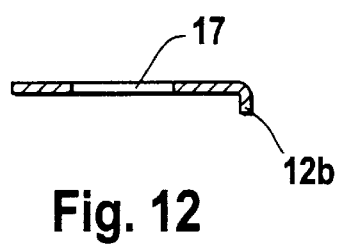
FIG. 12 is a sectional view of the spring clip of FIG. 13 taken along line XII—XII.
Figure 13:
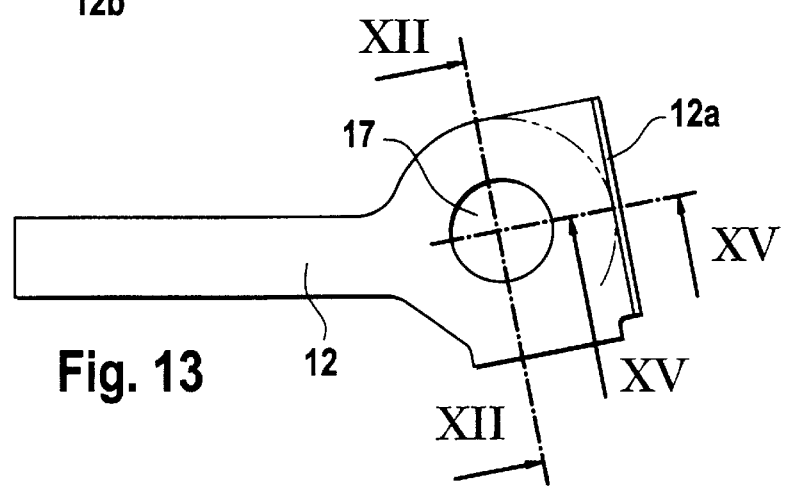
FIG. 13 is a view of the spring clip in the direction of viewing arrow XIII of FIG. 10.
Figure 14:
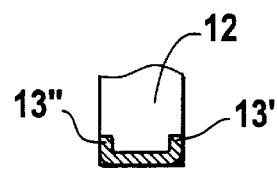
FIG. 14 is a cross-sectional view of the spring clip of FIG. 10 taken along line XIV—XIV.
Figure 15:
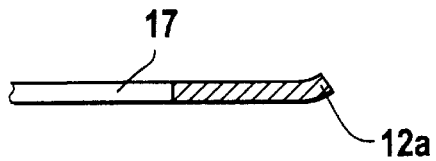
FIG. 15 is a partial sectional view taken along line XV—XV in accordance with FIG. 13.

In the embodiment shown in FIGS. 6 to 9, the spring clip 12 is connected to the pressure plate 1 via the rivet 14, which attaches the leaf spring 9 to the pressure plate. The thickened portion 13 is pushed in between pressure plate 1 and clutch casing 3. The spring clip 12 may be provided both axially on the outside (in the direction of the transmission unit) (FIGS. 6 and 7) or axially on the inside (in the direction of the clutch disc) (FIGS. 8 and 9).

The structure of the spring clip 12 can be clearly seen from FIGS. 10 to 15. The clamped-in end is provided with a central hole 17, via which the spring element 12 is attached. The side of the rear (clamped-in) wider end is provided with an antirotation lock 12b which engages around the tangential leaf spring 9. The spring clip 12 is provided with an unrolling edge 12a at the outer, clamped-in end. For this purpose, the point has a radius around which the leaf spring 9 can bend in its deflected position, so that there is no crease point which would damage the material and would be produced if the end of the spring clip 12 has a sharp-edge. In order to prevent the thickened portion 13 from laterally creasing out, it is possible to provide the front end of the spring clip 12 with a U-shaped stamped-out portion 16 and to wind the free limbs 13', 13", which have previously been bent upward through 90°, inward (see FIGS. 11 and 14). This inward winding is carried out by bending and rolling transversely to the load direction. The result is two rectangular profiled sections, which have a corresponding stability.

Figure 16:
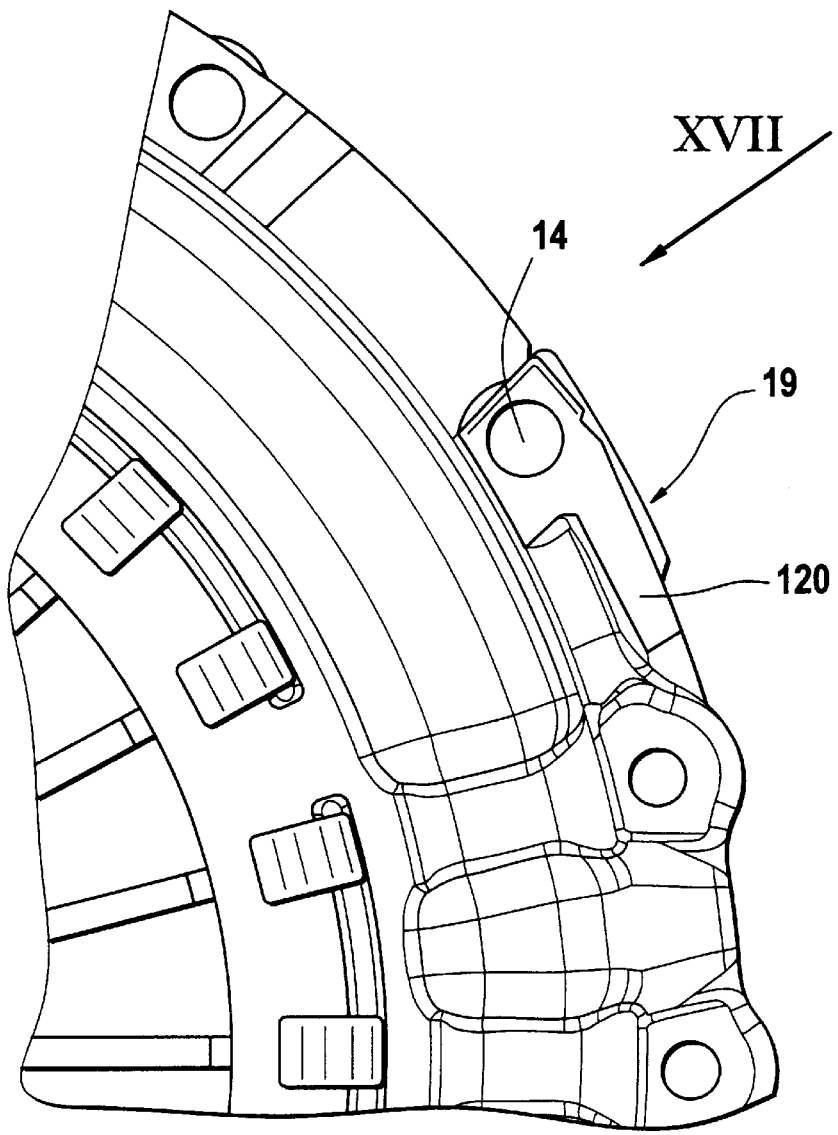
FIG. 16 is another partial plan view of a clutch casing according to a further exemplary embodiment of the invention.
Figure 17:
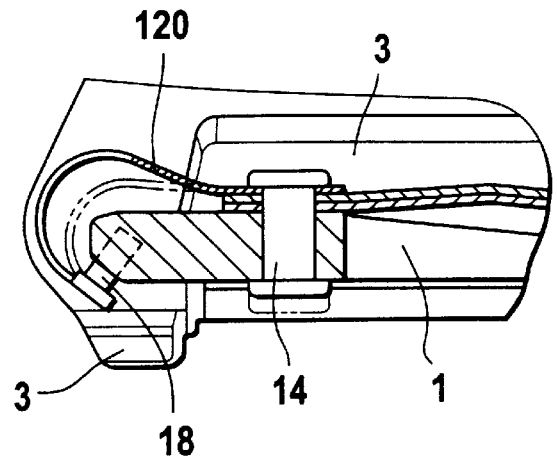
FIG. 17 is a partial plan view in the direction of viewing arrow XVII of FIG. 16.
Figure 18:
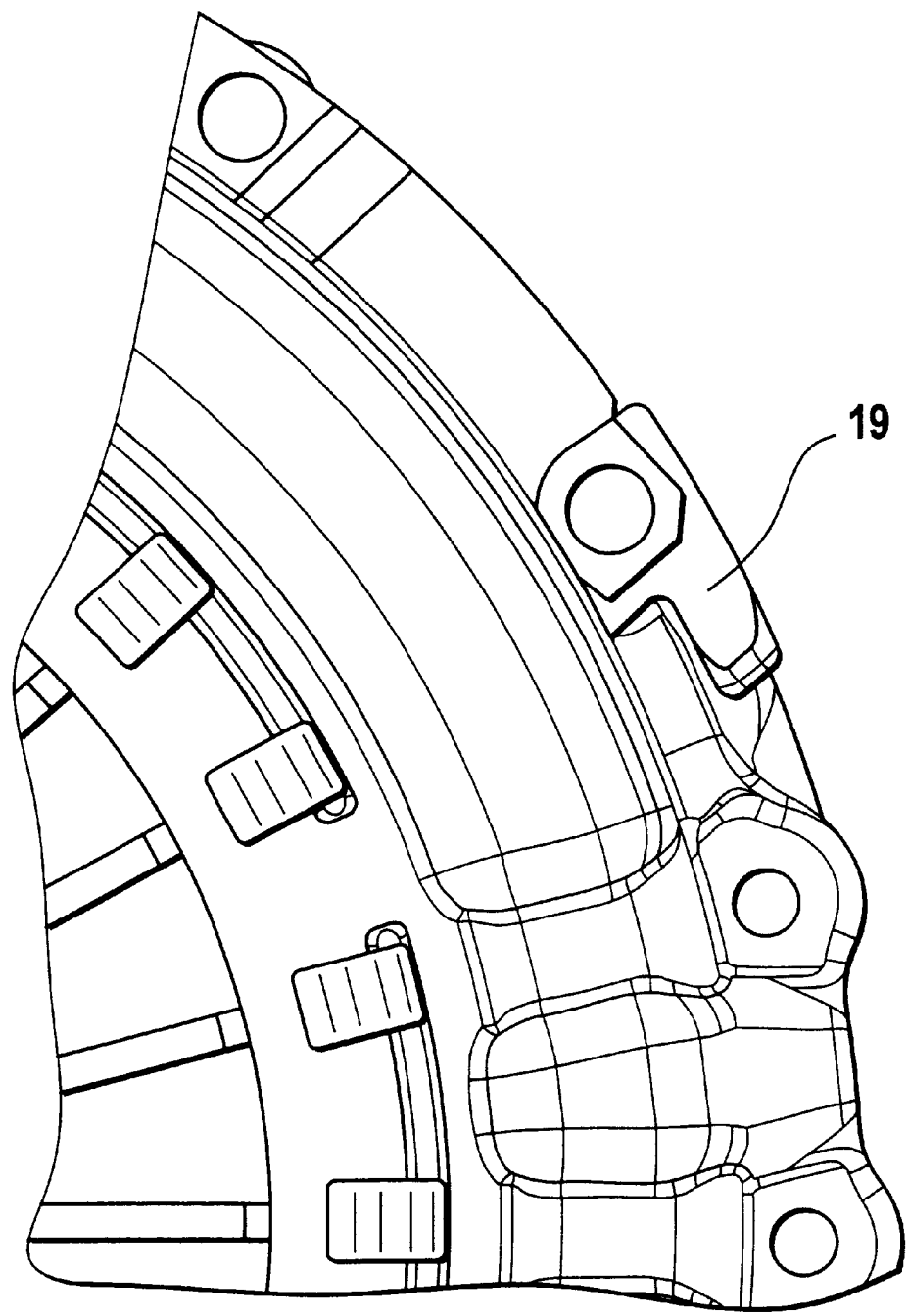
FIG. 18 is a partial plan view of the clutch casing depicted in FIG. 16 without the spring clip.
Figure 19:
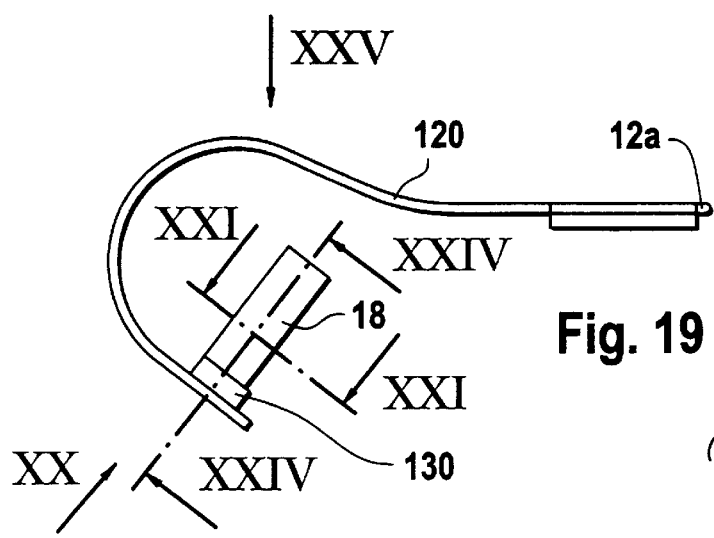
FIG. 19 shows another further exemplary embodiment of a spring clip in accordance with the invention.
Figure 20:
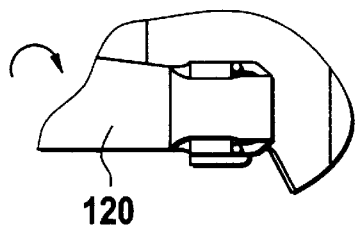
FIG. 20 shows another view of the spring clip shown in FIG. 19 taken in the direction of viewing arrow XX.
Figure 21:
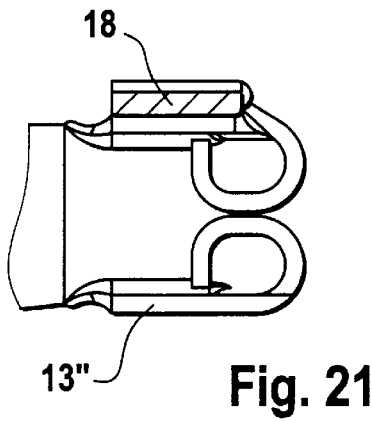
FIG. 21 is a cross-sectional view of the spring clip taken along line XXI—XXI of FIG. 19.
Figure 22:
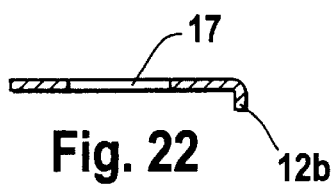
FIG. 22 is a sectional view taken along line XXII—XXII of FIG. 25.
Figure 23:
FIG. 23 is a sectional view taken along line XXIII—XXIII of FIG. 25.
Figure 24:
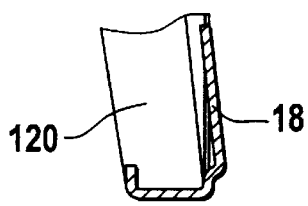
FIG. 24 is a sectional view taken along line XXIV—XXIV of FIG. 19.
Figure 25:
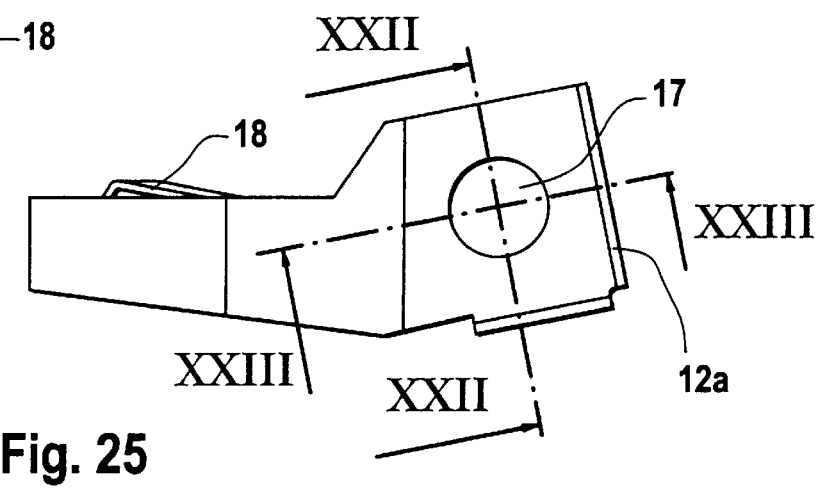
FIG. 25 is a plan view of the spring clip of FIG. 19 viewed in the direction of viewing arrow XXV.

FIGS. 16 to 25 illustrate a further exemplary embodiment of the invention. The spring clip 120 is provided at its free end with a tab 18 which starts from the thickened portion 130 and projects toward the end which is to be clamped in (FIG. 19). By means of a rivet 14, the spring clip 120 is connected to the pressure plate 1. To provide the transport securing means, the thickened portion 130 is placed between the pressure plate 1 and the casing 3 (FIG. 17). The tab 18 engages behind a projection 19 provided on the pressure plate 1 and secures the spring clip 120 in the radial direction. This prevents the spring clip 20 from giving way as a result of the centrifugal forces acting on it when the clutch is operated.

FIG. 18 shows an illustration which is similar to FIG. 16. In order to make the design of the projection 19 on the pressure plate 1 clearer, however, the spring clip 120 is omitted in this illustration.

The invention is not limited by the embodiments described above which are presented as examples only but can be modified in various ways within the scope of protection defined by the appended patent claims.

We claim:

1. An assembly for a motor vehicle friction clutch comprising:

a clutch casing having a pre-assembled pressure plate and a pressure spring arranged therein;

leaf springs coupling said pressure plate to said clutch casing in a rotationally fixed manner, said pressure plate being capable of moving axially with respect to said clutch casing;

at stop area associated with said pressure plate;

an opposing stop area on said clutch casing opposite said stop area;

releasable transport securing means comprising a locking element frictionally engaging between said stop area and said opposing stop area so as to prevent axial movement of said pressure plate toward an open end of said clutch casing, wherein said locking element can be disengaged by spring force when the clutch is fitted or first actuated; and a catch part passing though said clutch casing, said locking element comprising at least one spring clip having one clamped-in end attached to an outside of said clutch casing and a free thickened end, said free thickened end being placed between said catch part and said clutch casing.

2. The assembly in accordance with claim 1, wherein said thickened end is produced by flanging over the free end of said spring clip.

3. The assembly in accordance with claim 1, wherein said spring clip comprises a small plate connected to the free end, said small plate forming said thickened end.

4. The assembly in accordance with claim 1, wherein said clamped-in end of said spring clip is un-releasably connected to said clutch casing.

5. The assembly in accordance with claim 4, wherein said clamped-in end of said spring clip is riveted to said clutch casing.

6. The assembly in accordance with claim 1, wherein a thickness of said thickened end is equal to a maximum wear distance of the friction clutch.

7. The assembly in accordance with claim 1, further comprising a catch bolt riveted to said pressure plate, said catch part being formed by said catch bolt.

8. The assembly in accordance with claim 1, wherein a plurality of spring clips are distributed over a circumference of one of the clutch casing and the pressure plate.

9. The assembly in accordance with claim 1, wherein said spring clip is configured to have a radius towards the clutch casing at its clamped-in end.

10. The assembly in accordance with claim 9, wherein said radius is adapted to enable a rear end of said spring clip to perpendicularly bear against a deflected tangential leaf spring.

11. The assembly in accordance with claim 1, wherein said spring clip comprises a U-shaped design at its free end, and wherein said thickened portion is formed by winding the two legs of the U-shaped design inward.

12. The assembly in accordance with claim 11, wherein said legs are bent upward through 90°.

13. The assembly in accordance with claim 1, wherein said spring clip further comprises an anti-rotation lock.

14. An assembly for a motor vehicle friction clutch comprising:

a clutch casing having a pre-assembled pressure plate and a pressure spring arranged therein;

leaf springs coupling said pressure plate to said clutch casing in a rotationally fixed manner, said pressure plate being capable of moving axially with respect to said clutch casing;

a stop area associated with said pressure plate;

an opposing stop area on said clutch casing opposite said stop area; and releasable transport securing means comprising a locking element frictionally engaging between said stop area and said opposing stop area so as to prevent axial movement of said pressure plate toward an open end of said clutch casing, wherein said locking element can be disengaged by spring force when the clutch is fitted or first actuated, said transport securing means comprising at least one spring clip having one clamped-in end attached to the pressure plate and a free end having a thickened portion, wherein application of force to said spring clip enables said thickened end to be placed between the pressure plate and the clutch casing.

15. The assembly in accordance with claim 14, wherein said spring clip comprises a tab at its free end and said pressure plate comprises a projection behind which said tab engages.

16. The assembly in accordance with claim 15, wherein said tab is provided on said thickened portion.

17. The assembly in accordance with claim 15, wherein said tab projects in toward the clamped-in end of said spring clip.

18. The assembly in accordance with claim 14, wherein said spring clip is un-releasably connected to said pressure plate.

19. The assembly in accordance with claim 18, wherein said spring clip is riveted to said pressure plate at its clamped-in end.

20. An assembly for a motor vehicle friction clutch comprising:

a clutch casing having a pre-assembled pressure plate and a pressure spring arranged therein;

leaf springs coupling said pressure plate to said clutch casing in a rotationally fixed manner, said pressure plate being capable of moving axially with respect to said clutch casing;

a stop area associated with said pressure plate;

an opposing stop area on said clutch casing opposite said stop area; and releasable transport securing means comprising a locking element frictionally engaging between said stop area and said opposing stop area so as to prevent axial movement of said pressure plate toward an open end of said clutch casing, wherein said locking element can be disengaged by spring force when the clutch is fitted or first actuated, said stop area being formed by said pressure plate, and said locking element being form fitted between said stop area and said opposing stop area.

* * * * *